United States Patent [19]

Wilson et al.

[11] Patent Number: 5,017,629

[45] Date of Patent: May 21, 1991

[54] MOLDABLE LOW DENSITY THERMOPLASTIC COMPOSITE WITH HOLLOW GLASS SPHERES AND THE METHOD FOR COMPOUNDING

[75] Inventors: Gary F. Wilson, Grafton; Yona Eckstein, Kent, both of Ohio

[73] Assignee: The BF Goodrich Company, Akron, Ohio

[21] Appl. No.: 332,267

[22] Filed: Mar. 31, 1989

[51] Int. Cl.$^5$ .................................................. C08J 9/32
[52] U.S. Cl. ................................... 523/219; 523/351; 524/789
[58] Field of Search ............... 523/219, 351; 524/789; 264/D6, D7

[56] References Cited

U.S. PATENT DOCUMENTS

| | | | |
|---|---|---|---|
| 3,316,139 | 12/1964 | Alford et al. | 264/D6 |
| 3,866,652 | 2/1975 | Ahmad | 152/317 |
| 4,001,368 | 1/1977 | Michizoe et al. | 264/211 |
| 4,038,238 | 7/1977 | Cravens | 523/219 |
| 4,077,922 | 3/1978 | Farrissey, Jr. et al. | 523/219 |
| 4,111,349 | 9/1978 | Buckler et al. | 523/351 |
| 4,241,190 | 12/1980 | Lichter et al. | 264/D7 |
| 4,391,646 | 7/1983 | Howell | 106/97 |
| 4,416,926 | 11/1983 | Maglio | 428/304.4 |
| 4,556,603 | 12/1985 | Thorsrud | 523/219 |
| 4,788,230 | 11/1988 | Mudge | 264/D6 |

FOREIGN PATENT DOCUMENTS 0727696 2/1966 Canada ............................. 400/72

OTHER PUBLICATIONS

Advertisement; Welding Engineers, Inc., Blue Bell, PA 19422, USA.

*Primary Examiner*—Lewis T. Jacobs
*Assistant Examiner*—Karen A. Hellender
*Attorney, Agent, or Firm*—Debra L. Pawl

[57] ABSTRACT

An improved moldable low density thermoplastic composite containing hollow glass spheres comprising a blend of thermoplastic resin, glass fiber reinforcement, and a concentrate of hollow glass spheres dispersed in thermoplastic resin.

21 Claims, No Drawings

MOLDABLE LOW DENSITY THERMOPLASTIC COMPOSITE WITH HOLLOW GLASS SPHERES AND THE METHOD FOR COMPOUNDING

FIELD OF INVENTION

The present invention generally relates to reinforced thermoplastic polymer composites containing hollow glass spheres. In one aspect, the invention specifically relates to a moldable fiber reinforced thermoplastic resin composite having blended therein a concentrate of hollow glass spheres dispersed within a thermoplastic resin, to greatly reduce the fracture and increase the efficiency of the spheres to significantly lower the specific gravity of the composite. In another aspect, the invention relates to a method for compounding the low density composite. In still another aspect the invention is related to molded articles comprising the low density composite.

BACKGROUND AND SUMMARY OF THE INVENTION

During the last decade, the automotive and aircraft industries have concentrated their efforts on reducing the overall weight of the vehicles and aircraft. Initially, weight reduction was achieved by replacing metal parts with suitable plastic parts. However, in structural applications, the plastic parts are very often lacking in mechanical performance. Thus, to improve their performance, various reinforcing fibrous materials, such as glass, carbon or aramid fibers, are added to the plastic resin. As a cost savings measure, inorganic fillers, such as talc, calcium carbonate or clay are also added to the resin.

However, the addition of the fibers and inorganic fillers undesirably increases the composite's specific gravity and weight per molded part. Additionally, an increase in price per unit volume may follow. To counteract this weight increase, it is known that hollow glass spheres may be added. Traditionally, the host matrix for the hollow spheres has been a thermosetting resin which does not present the processing problems of thermoplastic resins. Before curing, thermoset resins have a relatively lower viscosity than thermoplastic resin and thereby provide a more readily workable medium. Generally speaking, the more viscous thermoplastic resins require more work and higher shear forces in order to process before cure. Consequently, it is more difficult to compound fragile additives into thermoplastics without substantial breakage.

To minimize fracture when compounding into thermoplastic resins, relatively strong glass spheres can be used, as disclosed in U.S. Pat. No. 4,391,646. However, when combined with relatively high amounts of reinforcing glass fiber, the inventors have found that sphere fracture is intensified. It is believed that the abrasive physical contact between the rigid hollow glass spheres and the fiberglass, under high shear forces, causes additional sphere fracture. Even further fracturing of the spheres is known to occur during subsequent compression and, in particular, injection molding processes, used to form objects, such as car bumpers.

Hollow sphere fracture is undesirable because it raises the specific gravity of the composite and defeats the purpose for adding the spheres. In order to take full advantage of the specific gravity reduction seen in the presence of hollow spheres, the integrity of the spheres must be maintained during compounding and subsequent processing or molding.

The inventors have also observed that the hollow glass spheres similarly degrade glass fiber length and that further processing dramatically diminishes the fiber length below that necessary for efficient stress transfer from the polymer matrix to the fiber. Fibers which are shorter than this critical length will be less effective as reinforcements. In order to improve the mechanical properties of glass fiber thermoplastic polyurethane composites, the fiber length must be maximized.

A method has now been discovered which diminishes or eliminates fracture of hollow glass spheres, and degradation of glass fiber length, in thermoplastic composites made by melt compounding, thus lowering and maintaining the lowered specific gravity of the composite.

This invention embodies the discovery that hollow glass sphere fracture is minimized in fiberglass reinforced thermoplastic resin composites made by melt compounding, by adding a concentrate of spheres dispersed in thermoplastic resin (masterbatch). Superior results will be realized in some instances, i.e., fracture can be eliminated, when the masterbatch is made by adding the spheres during the in situ polymerization of the masterbatch resin. It is believed that the masterbatch resin covering the glass spheres protects them from breakage by lessening the effects of the shear forces exerted by the mechanical action of the compounding apparatus and the abrasive contact with the glass fibers. Consequently, by substantially maintaining the integrity of the spheres, one is able to maintain the lowered specific gravity of the composite. It has been further discovered that the inventive thermoplastic composites continue to minimize sphere fracture even when further processed in high stress molding methods.

DETAILED DESCRIPTION OF THE PREFERRED EMBODIMENTS

In accordance with one aspect of the present invention, there is provided a method for compounding a low density, melt processable reinforced thermoplastic resin composite with hollow glass spheres. The method is a melt or extrusion compounding method comprising melting a thermoplastic polymer while simultaneously mixing said polymer, under high shear forces; adding reinforcing fiber, and hollow glass spheres dispersed in a thermoplastic resin to form a composite; extruding said composite; and cooling said composite; and wherein the polymer is continuously mixed, under high shear forces, from the melting step to the extruding step.

By employing the present method, a reduction or elimination of hollow glass sphere fracture during compounding with a thermoplastic resin, especially resins containing large amounts of fibrous reinforcements, will be realized. This means that the lowered density of the reinforced resins incorporating the spheres can be substantially maintained throughout processing and reprocessing and the density-lowering effect of the spheres more fully utilized.

This inventive method can be practiced by using conventional melt or extrusion compounding techniques. A typical melt compounding process involves feeding a solid polymer into an extrusion apparatus equipped with a screw device. The polymer is heated and melted and fillers and/or reinforcements are added as it is passed along the length of the screw. The action of the screw disperses and evenly distributes the added ingredients into the polymer matrix, constantly exerting high shear forces upon the ingredients.

The resultant composite exits the apparatus by extrusion through a die and is then cooled. The composite is exposed to additional high shear and/or compression forces as it is reprocessed to form molded structural articles having commercial utility via extrusion injection molding, for example.

Any conventional extruder apparatus permitting compounding of the resin with the particulate additives can be used. Suitable designs are those having a single screw, twin screw, or a modified screw configuration. Commercially available and suitable apparatus include a Werner-Pfleiderer co-rotating intermeshing twin screw model, and a Welding Engineers unit with a counter-rotating, non-intermeshing, twin screw design, from Welding Engineers, Inc., Blue Bell, Pa., U.S.A. Single screw extruders are available from Bersdorff in Charlotte, N.C. Suitable results were also achieved with a Buss Kneader available from Buss America, Elk Grove, Ill., U.S.A. One skilled in the art will appreciate that without undue experimentation, and to the extent possible, the screw configuration can be adjusted so as to minimize fracture of fragile additives, such as the glass microspheres.

The critical aspect of this method is introducing the spheres as a concentrate of spheres dispersed in a thermoplastic resin, also called a masterbatch. It has been found that the resin covering the spheres protects them from the high shear forces of the compounder/extruder and the abrasive action of the fiberglass reinforcement. Consequently, less breakage of the spheres occurs and the relatively low density of composites incorporating such a masterbatch is better maintained.

It will also be appreciated by one skilled in the art that the masterbatch is used as a concentrate of hollow spheres, which becomes diluted upon addition to a compounding resin not containing the spheres.

The masterbatch can be made by using conventional melt or extrusion compounding techniques, as described hereinabove. The inventors discovered that superior results are obtained when the masterbatch is made by an in situ polymerization method wherein the hollow glass spheres are incorporated during the polymerization of the resin. Surprisingly, this method produced a masterbatch with significantly fewer fractured spheres. Moreover, highly reinforced composites compounded with this masterbatch using high strength spheres, produced molded articles with little or no fractured spheres.

The in situ polymerization process is a reaction extruder process. The reactor may be a separate unit or a part of the extruder, configured or designed to conduct the initial polymerization. The polymer reactants are added to the reactor portion of the apparatus where polymerization begins. The reacting mixture is then passed into the extruder portion of the apparatus during which time the polymerization reaction is completed before the polymer resin exits through the extruder die. As in any conventional extruder process, the resin is subjected to high shear mixing forces as it passes down the extruder. The hollow glass spheres may be added at any time during the polymerization, but preferably they are added after about 50% to about 90% of the material is polymerized.

For example, an in situ polymerized thermoplastic polyurethane masterbatch containing hollow glass spheres was made by separately heating the two resin components, that is, a blend of polyol and diol, and MDI to about 100° C. The blend and the MDI were then mixed together in the reactor to begin the standard high temperature random melt polymerization reaction. Due to the exothermic nature of the reaction, the temperature increased to about 200° C. to 280° C. in about 1 to 5 minutes. An increase in the material's viscosity was evidence that polymerization was occurring. When approximately 90% reacted, the material was passed into the extruder, where it was mixed under high shear forces and polymerization completed before the polymer resin exited through the extrude die. The hollow glass spheres were added to the polymerizing resin just before it entered into the extruder.

Conventional techniques and conditions may be used to in situ polymerize the other suitable resins.

The masterbatch can be made of any thermoplastic resin. Suitable resins include polyurethanes, polyesters, polycarbonates, polyamides, polystyrenes, polymethylmethacrylate and polyvinyl chloride.

Thermoplastic polyurethane (TPU) is the preferred resin. Most desirable are those TPUs formulated for use in extrusion, injection molding and compression molding processes. Suitable polyurethanes are prepared by reacting a polyisocyanate with a blend of a hydroxyl terminated polyester, polyether or mixtures thereof and one or more chain extenders.

The hydroxyl terminated polyester is generally a linear polyester having a molecular weight of about 500 to about 10,000 and preferably from about 700 to about 5000 and acid number generally less than 1.3 and preferably less than 0.8. The molecular weight is determined by assay of the terminal functional groups and is an average molecular weight. The polyesters are produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups.

The dicarboxylic acids can be aliphatic, cycloaliphatic or aromatic. Suitable dicarboxylic acids which may be used alone or in mixtures include: succinic, glutaric, adipic, pimelic, suberic, azelaic, sebacic, dodecanedioic, isophthalic, terephthalic cyclohexane dicarboxylic and the like. Anhydrides of the above dicarboxylic acids such as phthalic anhydride, tetrahydrophthalic anhydride or the like can also be used. Adipic acid is the preferred acid.

The glycols can be aliphatic or aromatic. Suitable glycols include: ethylene glycol, propylene-1,2-glycol, 1,3-propanediol, butylene-1,3-glycol, 1,4-butanediol, 1,6-pentanediol, 1,6-hexanediol, 2,2-dimethylpropane-1,3-diol, 2,2-diethylene-1,3-diol, 1,4-cyclohexanedimethanol, decamethylene glycol, dodecamethylene glycol, and the like. 1,4-butanediol is the preferred glycol. Suitable polyesters include polycaprolactone typically made from -caprolactone and a bifunctional initiator such as diethylene glycol, while the polycarbonates are typically made from diols, such as hexanediol-1,6, and phosgine or by transesterification with low molecular weight carbonates like diethyl or diphenyl carbonate. Suitable polycarbonates and methods of preparation are disclosed in U.S. Pat. No. 4,643,949, which is incorporated herein by reference.

Polyether glycols that can be used are polytetramethylene ether glycol (PTMEG), polyethylene glycol, polypropylene glycol, ethylene oxide capped polypropylene glycol, polytetramethylene/ethylene oxide ether glycol and the like. Such polyether glycols can have a molecular weight of about 500 to 4000 and preferably from about 800 to about 2000. A preferred polyether glycol is polytetramethylene ether glycol.

Although any conventional polyisocyanate can be used, the preferred one is a diisocyanate which can be aliphatic or aromatic. Suitable diisocyanates include: decane-1,10-diisocyanate, phenylene-1,4-diisocyanate, naphthylene-1,5-diisocyanate, diphenylmethane-4,4'diisocyanate (MDI), diphenylmethane-3,3'-dimethyoxy-4,4'-diisocyanate, dicyclohexylmethane-4,4'-diisocyanate, and cyclohexyl-1,4-diisocyanate.

Typically the polyols are blended with a chain extender before reaction with a polyisocyanate. The chain extender may be any diol, or combination of diols, containing 2 to 10 carbon atoms, such as ethylene glycol, propylene glycol, 1,4-butanediol, 1,3-butanediol, 1,5-pentanediol, 1,6-hexanediol, 1,4-cyclohexane-dimethanol, hydroquinone di(hydroxyethyl)ether, or any aliphatic or aromatic molecule containing two reactive hydroxyl groups. The preferred chain extender is 1,4-butanediol.

The hydroxyl terminated polyols described above can be blended with a chain extender before the blend is reacted with a diisocyanate or the polyol and chain extender can be brought to the reaction zone simultaneously. Stabilizers such as antioxidants can be added prior to the reaction or during the reaction.

The amount of the chain extender is generally from about 0.04 to about 35 moles and desirably from about 0.07 to about 20 and more preferably from about 3 to about 15 for every mole of the hydroxyl terminated polyol. Generally, the number of moles of diisocyanate per total number of moles of the hydroxyl terminated polyol and the chain extender is from about 0.95 to about 1.12, and preferably from about 0.98 to about 1.06.

It was found that a higher molecular weight polymer also aided in diminishing the fracture of the glass spheres. When the ratio of isocyanate (NCO) to hydroxyl (OH) is about 1:1, then a polymer having a molecular weight of at least about 200,000 is desirable.

The hollow spheres are desirably unicellular glass microspheres composed of a water resistant and chemically stable glass, such as a soda-lime-borosilicate glass. Typically, such a glass is non-porous, non-combustible and has a low alkalinity thus making the spheres compatible with most resins, not a fire hazard and non-absorbent with respect to the matrix resin. The spherical shape of the bubbles provides minimum surface area to volume ratio. The spheres typically appear uniformly white in color to the unaided eye.

Typically, the average size of the spheres may range from about 8 microns to 180 microns. Generally, the average true particle density, in grams per cubic centimeter (g/cc), of the spheres ranges from about 0.12 to about 1.10. The strength of the sphere largely depends upon the thickness of the wall. The best results were obtained with the higher strength spheres. Desirably, the spheres will have an average hydraulic crush strength of between about 5,000 to about 10,000 psi.

A variety of hollow glass microspheres are commercially available, including those known as Scotchlite TM from the Minnesota Mining and Manufacturing Company (3M), St. Paul, Minn., U.S.A. The preferred spheres are the Scotchlite TM B46/4000 Glass Bubbles, which average 149 microns in diameter and have an average particle density of 0.46 g/cc and S60/10,000 Glass Bubbles which average 149 microns in diameter and have an average particle density of 0.60 g/cc. The stronger and most preferred is the S60/10,000 sphere.

As a practical matter, the amount of spheres which can be incorporated into the masterbatch resin depends on the density of the spheres. Generally, if one adds to a resin the same weight percent of spheres having different densities, then the lower density spheres will occupy a larger volume of the resin than the higher density spheres. For example:

| spheres (density g/cc) | weight (%) | volume occupied (%) |
| --- | --- | --- |
| 0.46 | 40 | 64 |
| 0.60 | 40 | 58 |

Also, if the masterbatch polymer is lacking in physical properties, then it may be desirable to minimize the effect of the polymer by increasing the volume of the spheres and thereby decreasing the amount of polymer later to be added to the reinforced resin. Desirably, the masterbatch will contain, by volume, from about 20% to about 65% spheres, preferably from about 35% to about 55%, and most preferably about 50%.

It is not necessary, but if desired the spheres may be treated with conventional glass fiber sizes.

Returning to the method of compounding the masterbatch of hollow glass spheres into a thermoplastic resin, any thermoplastic resin may be used. The same resins described hereinabove for use as the masterbatch resin are useful as the composite matrix as well, and their description will not be repeated. A polyurethane is the preferred resin. As with the masterbatch, preferably, the TPU will be a melt processable TPU formulated for use in extrusion, injection molding and compression molding processes.

In the melt compounding method of the instant invention, the thermoplastic polyurethane is used as a solid, usually in pellet form, and then melted in the compounding/extruding apparatus. Depending upon the desired end volume of the composite, any quantity of solid TPU may be used.

The temperature of the apparatus is generally a temperature sufficient to melt the polymers. For TPU, the temperature is typically between 360° and 460° F. (182° and 238° C.)

The fibrous reinforcement may be made of any material including carbon, aramid or glass. Fiberglass is preferred, and may take any form, such as chopped, milled or continuous glass fibers. The glass fibers may be any length to achieve the desirable reinforcing properties, however, generally, it is desirable to use fibers no less than 0.3 millimeter (mm) in length. Fibers shorter than this tend to lose their reinforcing properties. The fibers may be coated with conventional sizes for thermoplastic and thermoset resins. The amount of reinforcing fiber used can vary depending upon the desired product properties or requirements, however, since it is generally found that the majority of mechanical properties of the composites are controlled by the glass fiber content, relatively high percentages of fiber are included. Typically, from about 10% to about 45%, preferably from about 10% to about 30%, and most preferred, from about 15% to about 25% by weight of the composite is comprised of fiberglass reinforcement.

Inorganic fillers may optionally be added to the resin during the melt compounding. Any particulate inorganic filler is suitable, including talc, calcium carbonate, clay or wollastonite, which is a natural calcium meta silicate. When included in the composite, the amount of inorganic filler will vary depending upon the cost and desired mechanical properties. Generally up to 15% by weight may be added to the composites of the present invention.

Thus, in another aspect, the present invention provides a moldable, low density thermoplastic resin composite containing hollow glass spheres, said composite comprising a blend of thermoplastic resin, fiber reinforcement and a concentrate of hollow glass spheres dispersed in thermoplastic resin. The above composites can be formed into molded articles using conventional processes such as injection molding/extrusion and compression molding.

The composite may contain, by volume, from about 1% to about 25% hollow glass spheres. Preferably, the composite will contain from about 5% to about 16% and most preferred is from about 5% to about 12% hollow glass spheres. When using spheres having 0.60 g/cc specific gravity, the composite will contain from about 3% to about 10% hollow glass spheres, preferably 3% to 7% spheres, by weight.

The density of the composite will vary depending upon the reinforcement and filler content as well as the end use application. For example, for automotive applications a composite desirably has a density of about 1.22 g/cc and contains about 15% glass fiber and 7% hollow spheres. Without the spheres, the density of the composite is 1.34 g/cc.

By melt compounding with the masterbatch of the stronger glass spheres, the fracture of the glass spheres is minimized or eliminated, not only in the resulting composite, but also in articles molded from these composites. Thus, the density lowering effect of the hollow spheres can be retained. It is known that during molding, materials are subjected to stress tensor with normal and shear components. Although various factors influence the magnitude of stress, relatively speaking, the total stress exerted in the injection molding/extrusion process is significantly greater than compared to compression molding. There are additional contact stresses at work during injection molding and extrusion due to the screw configuration of the molding apparatus. Furthermore, the flow path in injection molding machines is substantially greater than in compression molding processes, thus increasing the probability of sphere fracture. The present inventive composite composition substantially overcomes the previously known breakage problem for hollow glass spheres.

Thus, in still another aspect, the present invention provides a molded article comprising a low density thermoplastic resin composite comprising a blend of thermoplastic resin, glass fiber and glass spheres dispersed in a thermoplastic resin. For purposes of this invention a molded article shall also mean an article made by an extrusion process.

SPECIFIC EMBODIMENTS

In the following Examples 1-13, conventional melt compounding methods were used to make the composites. The masterbatch resin and compounding resin were thermoplastic polyurethanes, comprised of MDI, a polyol having a molecular weight between 3,000 and 4,000, adipic acid and 1,4 butane diol. All specific gravity measurements were made on injection molded plaques unless specified otherwise. The plaques were molded on a 120 Ton press using 400-600 lbs. injection pressure. The hollow glass spheres were 3M, Scotchlite TM B46/4000 and S60/10,000. The glass fibers were Owens-Corning Fiberglas Corporation's ¼" chopped fibers.

The results are summarized in Table I.

Examples 1 and 2

The effect of injection molding on hollow sphere fracture is demonstrated when the hollow spheres alone are melt compounded into the resin, as opposed to using the inventive masterbatch concentrate of spheres dispersed in a resin.

Examples 3-6

Examples 3-5 demonstrate the effect of glass fiber content on the extent of hollow sphere fracture, when hollow spheres are melt compounded into a compounding resin, that is not using a masterbatch of spheres. Example 6 shows the damage to the spheres by the added presence of an inorganic filler, talc, even when using relatively stronger spheres.

Examples 7-9

These examples demonstrate that the stronger spheres perform better in a masterbatch compounded with fiberglass filled resin. The compounds of Examples 1 and 2 were used as masterbatch of the hollow spheres. The glass fibers were added as a masterbatch of thermoplastic polyurethane resin with 30 weight % glass fibers.

Examples 10-13

These examples show the substantially improved effect of melt compounding with a masterbatch of spheres made by adding the spheres during the in situ polymerization of the masterbatch resin. Little or no sphere fracture was observed after molding the composite.

TABLE I

| Ingredient | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Glass Fiber Content (wt. %) | — | — | 10 | 15 | 20 | 10 | 10 | 10 | 10 | 19 | 23 | 16 | 30 |
| Talc (wt. %) | — | — | — | — | — | 15 | — | — | — | — | — | — | — |
| B46/4000, vol. % | 46.0 | — | 11.3 | 11.3 | 11.3 | — | 12.2 | — | — | — | — | — | — |
| B46/4000, wt. % | 22.5 | — | 4.3 | 4.3 | 4.3 | — | 4.7 | — | — | — | — | — | — |
| S60/10000, vol. % | — | 46.0 | — | — | — | 8.1 | — | 12.1 | 22.5 | — | — | — | — |
| S60/10000, wt. % | — | 30.0 | — | — | — | 5.0 | — | 6.1 | 11.8 | 2 | 2 | 10 | 10 |
| Sp. Gravity, Theoretical | 0.87 | 0.94 | 1.193 | 1.224 | 1.26 | 1.39 | 1.19 | 1.206 | 1.14 | 1.32 | 1.35 | 1.19 | 1.29 |
| Sp. Gravity, | 1.095 | 1.00 | 1.26 | 1.32 | 1.35 | 1.43 | 1.26 | 1.24 | 1.20 | 1.32 | 1.35 | 1.18 | 1.32 |

TABLE I-continued

| Ingredient | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Measured % Damaged Spheres | 47 | 17 | 60 | 83 | 84 | 100 | 63 | 30 | 37 | 0 | 0 | 0 | 18 |

Although the invention has been described in terms of specific embodiments of a manner in which the invention may be practiced, this is by way of illustration only and the invention is not necessarily limited thereto since alternative embodiments and operating techniques will become apparent to those skilled in the art. Accordingly, modifications are contemplated which can be made without departing from the spirit of the described invention.

We claim:

1. A method for compounding a low density, moldable thermoplastic resin composite with hollow glass spheres, comprising the steps of:
   (a) melting a thermoplastic resin;
   (b) adding reinforcing fiber and a concentrate of hollow glass spheres dispersed in a thermoplastic resin to form a composite;
   (c) extruding said composite; and
   (d) cooling said composite; and wherein the polymer is continuously mixed from the melting step (a) to the extruding step (c).

2. The method of claim 1 wherein the thermoplastic resin is a polyurethane.

3. The method of claim 2 wherein from about 15% to about 25%, by weight of the composite, glass fibers are added.

4. The method of claim 2 wherein from about 1% to about 25%, by volume of the composite, hollow glass spheres are added.

5. The method of claim 2 wherein from about 5% to about 12%, by volume of the composite, hollow glass spheres are added.

6. The method of claim 2 wherein about 10% by weight filler is added to the composite.

7. The method of claim 6 wherein the filler is talc.

8. The method of claim 2 wherein about 5% talc is added to the composite.

9. A moldable, low density composite containing hollow glass spheres comprising a blend of thermoplastic resin, fiber reinforcement, and a masterbatch of hollow glass spheres dispersed in thermoplastic resin, wherein the integrity of the spheres in the masterbatch is substantially maintained upon incorporation into the composite.

10. The composite of claim 9 wherein the hollow glass spheres are present in an amount of from about 2% to about 10%, by weight of the composite.

11. The composite of claim 9 wherein the hollow glass spheres are present in an amount) of from about 3% to about 7%, by weight of the composite.

12. The composite of claim 11 further comprising about 10% inorganic filler.

13. The composite of claim 12 wherein the filler is talc.

14. The composite of claim 9 wherein the glass fiber is present in an amount of from about 15% to about 25% by weight.

15. The composite of claim 9 wherein the glass fiber is present in an amount of about 15% and the hollow glass spheres are present in an amount of about 7% by weight.

16. The composite of claim 9 wherein the masterbatch is made by adding said spheres during the polymerization of the masterbatch thermoplastic resin.

17. The method of claim 1 wherein the concentrate of hollow glass spheres is made by adding the spheres during the polymerization of the concentrate's resin.

18. A molded article comprising a low density composite comprising a blend of thermoplastic resin, fiber reinforcement and a masterbatch of hollow glass spheres dispersed in a thermoplastic resin.

19. The composite of claim 9 wherein the masterbatch is made by a reaction/extrusion method whereby the spheres are added during the in situ polymerization of the thermoplastic resin.

20. A moldable, low density composite comprising the product of mixing a thermoplastic polymer masterbatch with thermoplastic polymer and reinforcing fiber, said thermoplastic polymer masterbatch comprising thermoplastic polymer and hollow glass spheres, wherein the integrity of the masterbatch spheres is substantially maintained in the composite.

21. The composite of claim 9 wherein the thermoplastic resin is polyurethane.

* * * * *